United States Patent
Zimmer et al.

(10) Patent No.: US 6,349,615 B1
(45) Date of Patent: Feb. 26, 2002

(54) LEVER

(75) Inventors: Joachim Zimmer, Sasbach; Henk Becker, Baden-Baden, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,068

(22) PCT Filed: Oct. 2, 1998

(86) PCT No.: PCT/DE98/02929

§ 371 Date: Sep. 13, 1999

§ 102(e) Date: Sep. 13, 1999

(87) PCT Pub. No.: WO99/36705

PCT Pub. Date: Jul. 22, 1999

(30) Foreign Application Priority Data

Jan. 14, 1998 (DE) ........................................ 198 01 059

(51) Int. Cl.[7] ................................................ G05G 1/04
(52) U.S. Cl. ........................ 74/519; 74/594; 74/579 R; 29/421.1; 72/61
(58) Field of Search .......................... 74/519, 524, 548, 74/579 R, 594; 403/122, 141, 142; 29/421.1; 72/60, 61, 62

(56) References Cited

U.S. PATENT DOCUMENTS

| | | | | |
|---|---|---|---|---|
| 617,484 A | * | 1/1899 | Haskell | 74/579 R |
| 1,013,878 A | * | 1/1912 | Hilton | 74/548 |
| 1,280,878 A | * | 10/1918 | Seymour | 74/579 R |
| 1,416,188 A | * | 5/1922 | Barman | 74/579 R |
| 1,426,705 A | * | 9/1922 | Williams | 403/122 |
| 1,458,331 A | * | 6/1923 | Garman | 74/579 R |
| 1,458,332 A | * | 6/1923 | Garman | 74/549 R |
| 1,474,854 A | * | 11/1923 | Spire | 74/579 R |
| 1,909,100 A | * | 5/1933 | Geyer | 74/579 R |
| 1,911,459 A | * | 5/1933 | Mitchell | 74/579 R |
| 2,005,004 A | * | 6/1935 | Peo | 74/579 R |
| 2,156,200 A | * | 4/1939 | Smyers | 74/548 |
| 2,287,608 A | * | 6/1942 | French | 74/579 R |
| 3,034,488 A | * | 5/1962 | Reiners | 74/579 R |
| 3,281,184 A | * | 10/1966 | Axtell | 403/122 |
| 3,603,171 A | * | 9/1971 | Dodge | 74/548 |
| 3,771,385 A | * | 11/1973 | Benoit et al. | 74/548 |
| 3,860,352 A | * | 1/1975 | Carlson | 403/122 |
| 4,059,361 A | * | 11/1977 | Allison | 403/141 |
| 4,419,804 A | * | 12/1983 | Axthammer | 74/579 R |
| 4,590,655 A | * | 5/1986 | Javorik | 29/421.1 |
| 4,704,918 A | * | 11/1987 | Orkin et al. | 74/579 R |
| 4,751,835 A | * | 6/1988 | Galaniuk et al. | 72/62 |
| 4,887,486 A | * | 12/1989 | Wood, Jr. | 403/141 |
| 5,011,321 A | * | 4/1991 | Kidokoro | 403/122 |
| 5,024,438 A | * | 6/1991 | Candow | 74/548 |
| 5,061,110 A | * | 10/1991 | Wood, Jr. | 403/141 |
| 5,284,400 A | * | 2/1994 | Thomas | 74/548 |
| 5,303,136 A | * | 4/1994 | Brown | 403/122 |
| 5,505,106 A | * | 4/1996 | Herman | 74/579 R |
| 5,556,224 A | * | 9/1996 | Niskanen | 74/524 |
| 5,898,974 A | * | 5/1999 | Boyer | 74/548 |
| 6,014,879 A | * | 1/2000 | Jaekel et al. | 72/61 |

FOREIGN PATENT DOCUMENTS

DE 44 44 328 A1 6/1996

* cited by examiner

Primary Examiner—David A. Bucci
Assistant Examiner—Chong H. Kim
(74) Attorney, Agent, or Firm—Michael J. Striker

(57) ABSTRACT

A lever, for example, for transferring force to another structural component of a mechanism, has a prefabricated connecting piece disposed on at least one of its ends. The lever is constructed as a hollow profile made of material that can be shaped without cutting. The hollow profile forms a receiving chamber on at least one end for the prefabricated connecting piece. The walls of the receiving chamber rest tightly against the circumference and the end faces of the connecting piece.

7 Claims, 5 Drawing Sheets

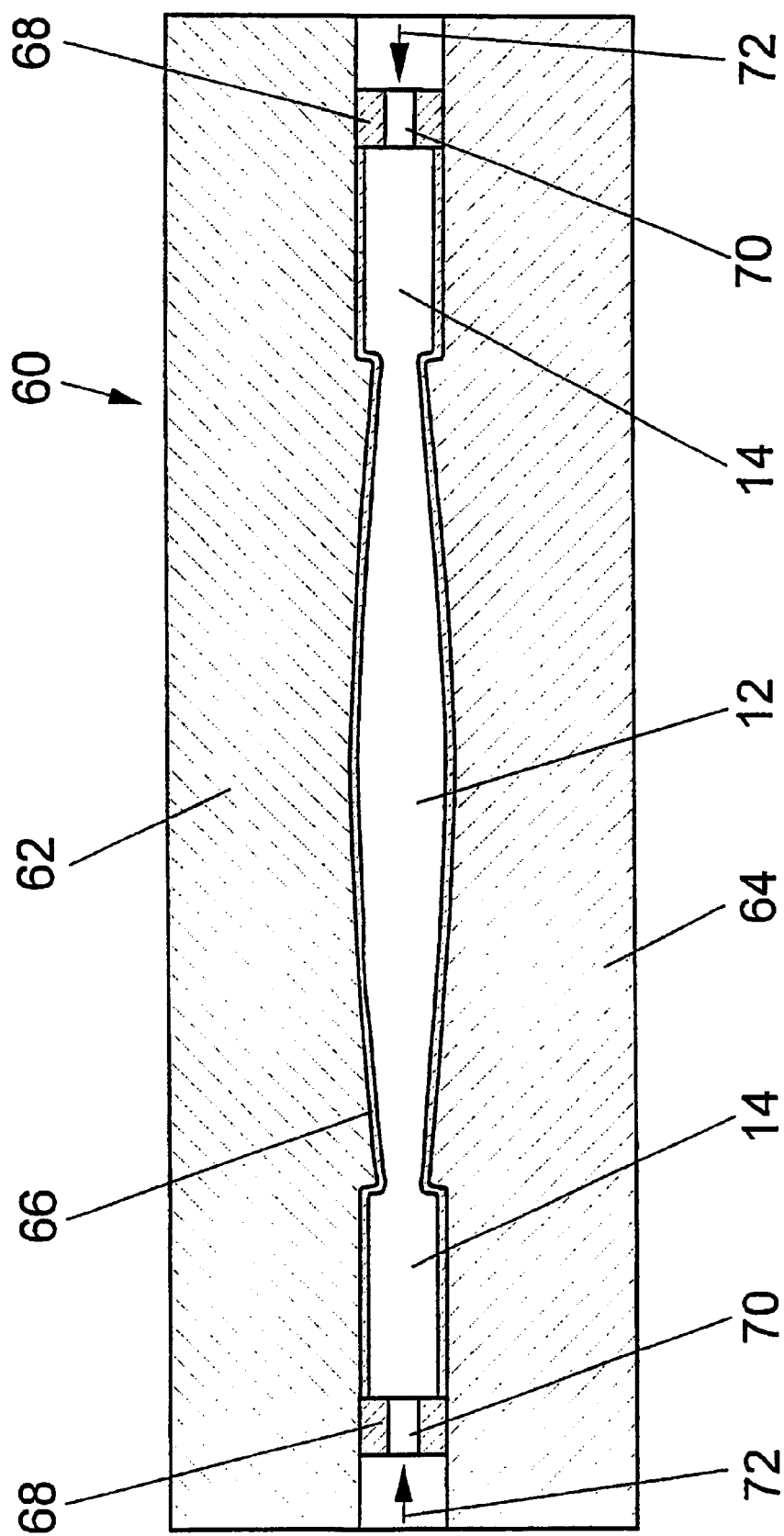

LEVER

BACKGROUND OF THE INVENTION

Field of Invention

The present invention relates to a lever, having at least one connecting piece for connecting to the other parts of the mechanism.

Levers are used in a wide variety of forms for transferring force, for example in coupling mechanisms, pivoting levers, and as fastening levers for connecting to driven shafts. In motor vehicles, they are used among other things for driving windshield wipers. Frequently, they are constructed of a support profile that is U-shaped in the center which, on its flat ends, has connecting pieces in the form of sockets that are cast into bores by means of injection molding. The sockets are supported on a small surface which is essentially produced by the narrow wall thickness or material thickness.

Levers for windshield wipers are already known which are made of zinc or a zinc alloy by means of diecasting in a diecasting form (DE 44 44 328 A1). Each lever has a conical hub on its one end, which can be connected to a likewise conical axle. A reinforcing element is provided in the vicinity of the hub and is cast into the lever like a core. It is costly to manufacture levers of this kind.

The periodical "Werkstatt und Betrieb" [Workshop and Operations], Karl Hanser Verlag Munchen, 1995, pp. 812 to 815 and the reprint from the periodical "Metallumformtechnik" [Metal Shaping Technology], Claus Dannert Verlag, 1994, under the title "Präzisions-Werkstücke in Leichtbauweise, hergestellt durch Innenhochdruck-Umformen", [Lightweight Precision Work Pieces Produced by Means of Internal High-Pressure Shaping] have disclosed a process for shaping pipes into work pieces. This process, which is primarily used for the automotive industry, works with high pressures.

The pipe section to be shaped is inserted into a split tool which has the desired work piece form incorporated into it. The tool, which is mounted in a press, is closed by means of a vertically functioning press ram. The pipe section ends are closed in a sealed fashion by means of closing tools through which a pressure medium is supplied which presses the pipe walls against the interior of the tool form. At the same time, horizontally acting rams exert an axial pressure onto the pipe section, which superposes the internal pressure. Consequently the material which is required for the shaping is not only taken from the wall thickness of the pipe section, but is also supplied by the shortening of the pipe. The closing tools are axially guided toward each other during the shaping.

BRIEF SUMMARY OF THE INVENTION

According to the invention, the lever has a hollow profile made of material that can be the shaped without cutting, which on at least one end constitutes a receiving chamber for a prefabricated connecting piece. The walls of the receiving chamber rest tightly against the end faces and the circumference of the connecting piece so that it is encompassed by two opposing walls of the hollow profile in a secure, uniform, captive fashion. The contact faces between the walls of the hollow profile and the connecting piece are independent of the wall thickness and fulfill the requirements for a uniform force introduction and favorable force transfer. Furthermore, the connecting piece fits harmoniously into the contour of the lever.

Depending on function, the connecting pieces can be differently embodied so that a multitude of lever variants can be produced with the same hollow profiles and different connecting pieces. Thus, the connecting pieces can have a bearing bore for a pivoting bearing, a socket for a ball-and-socket joint, or threaded bore for a fastening screw. The bearing bore can also be used as a through bore for a fastening screw.

In order to enlarge the contact surfaces between the connecting piece and the walls of the hollow profile, it is suitable that the connecting piece has a collar against which the walls of the receiving chamber are pressed. The collar is simultaneously used for better alignment of the connecting piece to the hollow profile and gives it a more stable position. This is further encouraged by virtue of the fact that the thickness of the collar increases toward the outer circumference so that an undercut is produced toward the inside into which the walls of the receiving chamber are pressed.

In order to align the connecting piece before the pressing procedure and to secure it temporarily in the receiving chambers, it is suitable that the receiving chambers have pre-formed beads toward the center part of the hollow profile, against which the connecting piece can be laid and between which it can be slid or clamped with its collar.

According to other embodiments of the invention, form fitting elements are provided which produce a positive fit between the connecting piece and the receiving chamber in the circumference direction of the connecting piece. This is advantageously achieved by virtue of the fact that the connecting piece or its collar has one or a number of recesses on its end face or circumference, into which the walls of the receiving chamber are pressed or caulked. Furthermore, the cross sectional contour of the connecting piece can have a shape which diverges from that of a rotational body, for example a polygon or oval. In many instances, a flattening on the circumference sufficiently secures the connecting piece against rotation.

Depending on the intended use, it can be desirable that the connecting pieces are open toward both sides or only open toward one side. These two variants can be simply covered according to the invention by virtue of the fact that the receiving chamber of the hollow profile in one instance has two opposing connecting openings and in the other instance has only one connecting opening. In the second instance, largely closed and therefore protected pivoting bearings can be simply produced with the same connecting pieces.

The levers with a hollow profile have a greater torsional rigidity so that the wall thickness in relation to open profiles can be reduced while maintaining the same torsional and flectional rigidity. This results in a lower consumption of material and a reduced weight. Furthermore, sharp edges are largely prevented by means of the hollow profiles and therefore the danger of injury is practically eliminated.

The hollow profile is suitably produced using an internal high-pressure shaping process in which a pipe section is inserted into a split tool form and the pipe ends are closed by means of sealing tools. Then the tool form is closed and pressure fluid is supplied by way of the sealing tools, so that the internal contour of the tool form with the hollow spaces for the hollow profile with the receiving chambers is formed by means of the pressure increase. The pipe ends are suitably slid toward each other axially with the sealing tools. Consequently, an axial pressure is exerted on the pipe ends during the shaping and uniform wall thicknesses and precise contours are produced, which require little or no mechanical finishing work.

Then the part is removed from the tool form and the required connecting openings are let into it. After this, the connecting pieces are inserted into the receiving chambers and the walls are placed against the connecting pieces in particular by means of pressing or wobble forging. Wobble forging is a process in which a press tool executes a wobbling motion around the advancing axis during the pressing process, by means of which the pressing forces can be reduced.

The process according to the invention permits a flexible form embodiment so that even in a complex version, levers can easily be produced which make favorable use of the available space. Levers with a wide variety of hollow profiles both in the longitudinal direction and in the lateral direction can therefore be produced, which fulfill a wide variety of requirements with regard to space, torsional rigidity, flectional rigidity, and noise production in accordance with the intended use.

The process advantageously uses low-strength galvanized steel pipe or a pipe made of an aluminum alloy. They are sufficiently pourable and corrosion resistant and do not need to be subsequently treated. In addition, aluminum alloys also have other weight advantages. Both weld-free and longitudinally welded pipes are used.

BRIEF DESCRIPTION OF THE DRAWINGS

Other advantages ensue from the following description. Exemplary embodiments of the invention are shown in the drawings. The drawings, the description, and the claims contain numerous features in combination. One skilled in the art will also suitably take the features into account individually and will combine them into other logical combinations.

FIG. 11 shows a schematic longitudinal section through a tool form for producing a lever according to the invention.

DETAILED DESCRIPTION OF THE INVENTION

Figure 1:
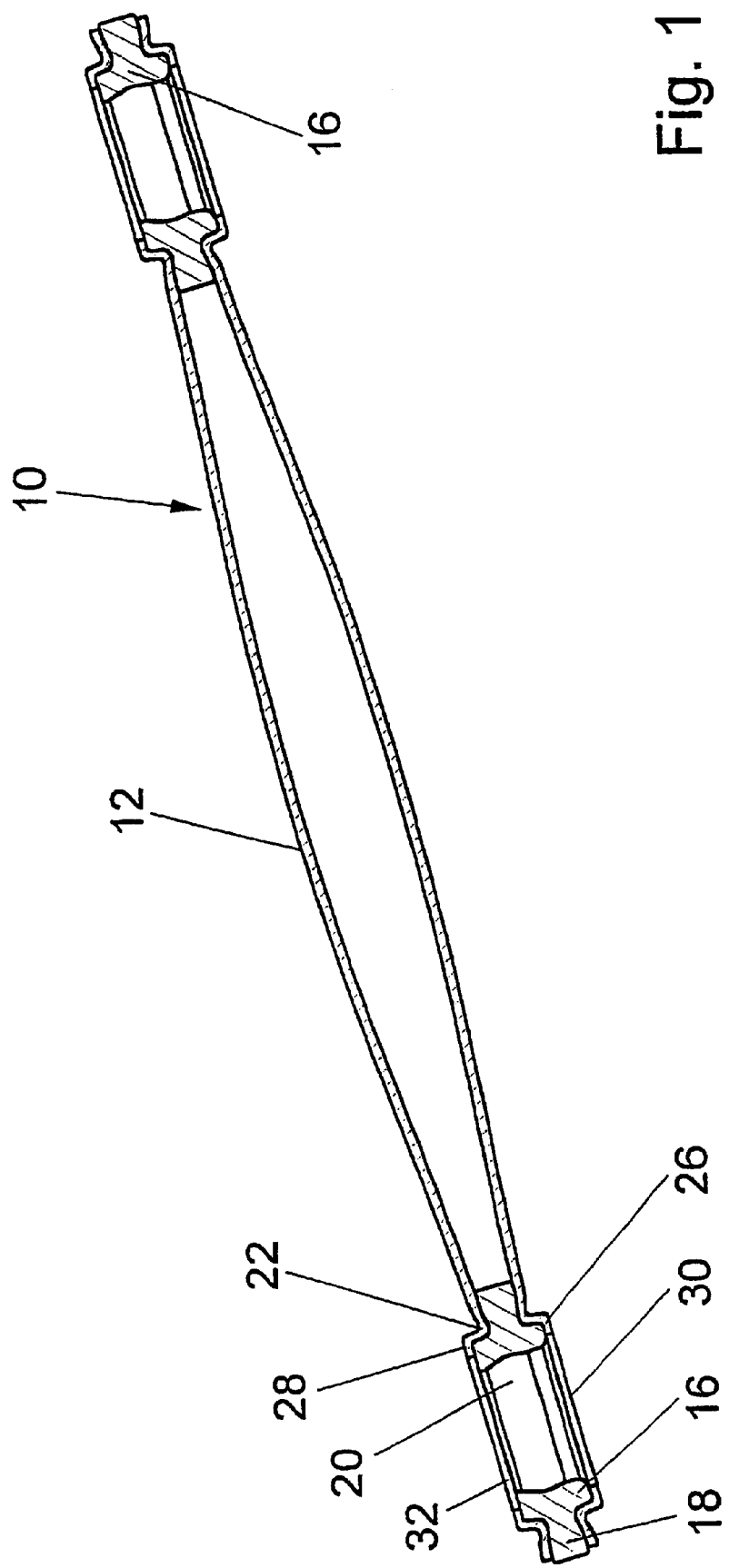
FIG. 1 shows a longitudinal section through a lever according to the invention.

The lever 10 according to FIG. 1 is a pivoting lever with a hollow profile 12, which constitutes receiving chambers 14 on its ends (FIG. 2) into which connecting pieces 16 are inserted through openings 74. Depending on the flectional stress, the cross section of the hollow profile 12 increases toward the center of the lever 10.

The connecting pieces 16 have a collar 18 on their circumference whose thickness increases toward the outside so that an undercut is produced into which walls 26 and 28 of the receiving chamber 14 are pressed. The walls 26 and 28 consequently rest in a large contact area against the end faces of the connecting piece 16, against its circumference surfaces, and against the collar 18.

Figure 2:
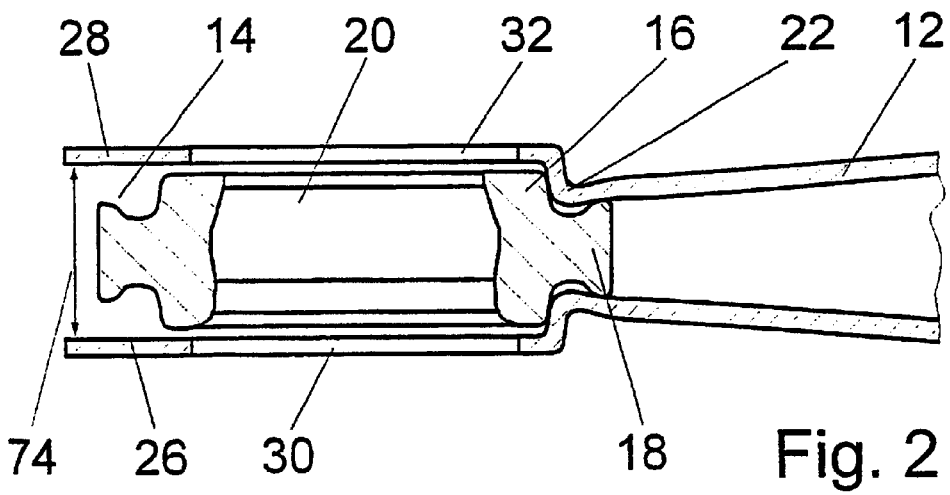
FIGS. 2 to 8 show an enlarged, partial, longitudinal section through an end region of a lever or a connecting piece in various embodiments.
Figure 3:
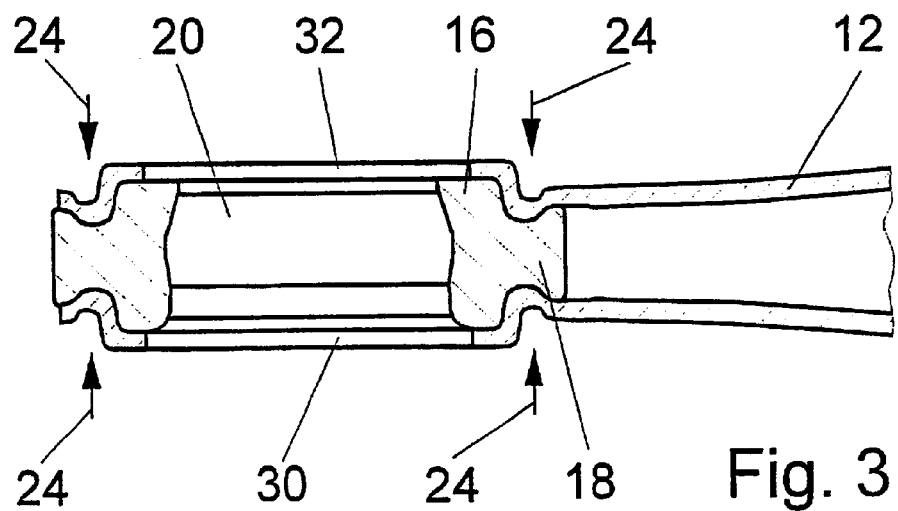
Figure 6:
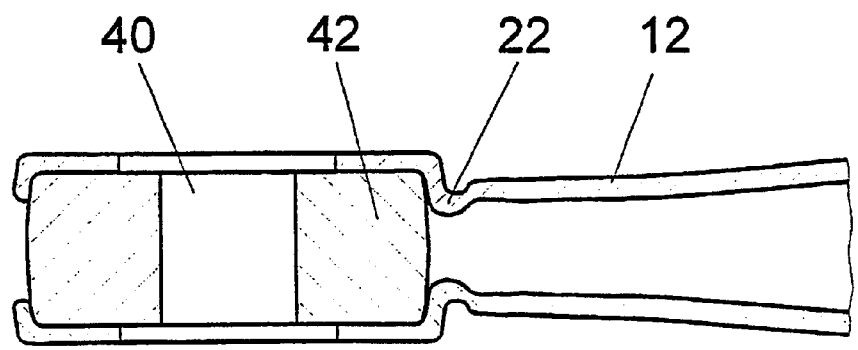
Figure 7:
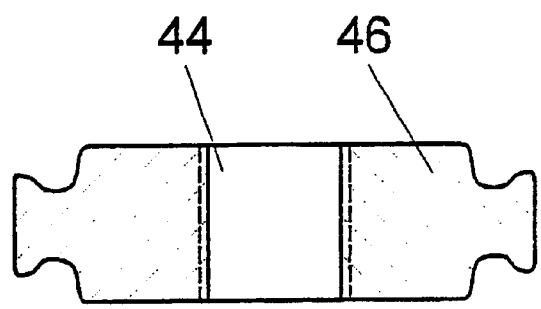
Figure 8:
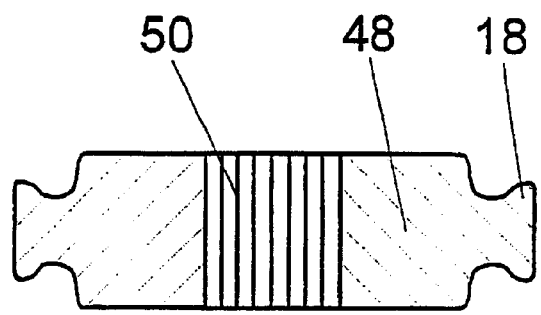
Figure 9:
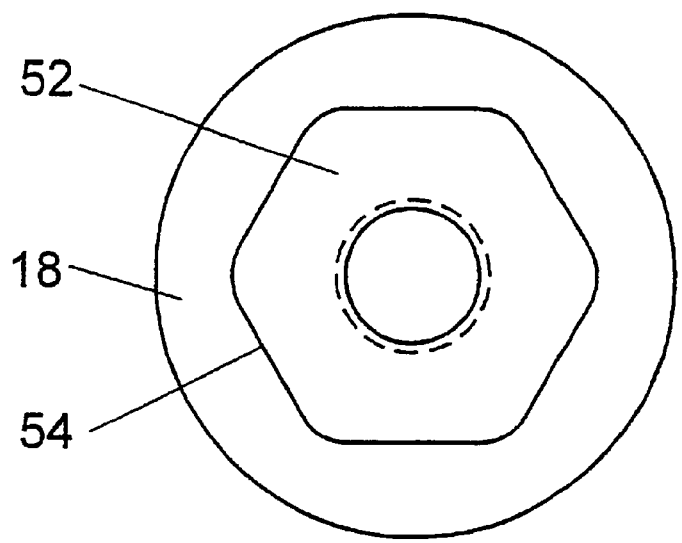
FIGS. 9 to 10 show a top view of a connecting piece in various embodiments.

FIG. 2 shows the connecting piece 16 before the pressing process. In order to align it in relation to the hollow profile 12 and to secure it temporarily, pre-formed beads 22 are provided on the hollow profile 12 toward the center part, against which beads the connecting piece 16 rests and between which the collar 18 is secured. The result of the pressing procedure is the finished lever according to FIG. 3. The pressing direction is labeled 24. The connecting pieces can be embodied in different ways. While the connecting pieces 16 and 38 have a socket 20 for a ball-and-socket joint, a connecting piece 42 (FIG. 6) has a bearing bore or through bore 40, a connecting piece 46 (FIG. 7) has a threaded bore 44, and a connecting piece 48 (FIG. 8) has a bore with a slaving profile 50.

Figure 10:
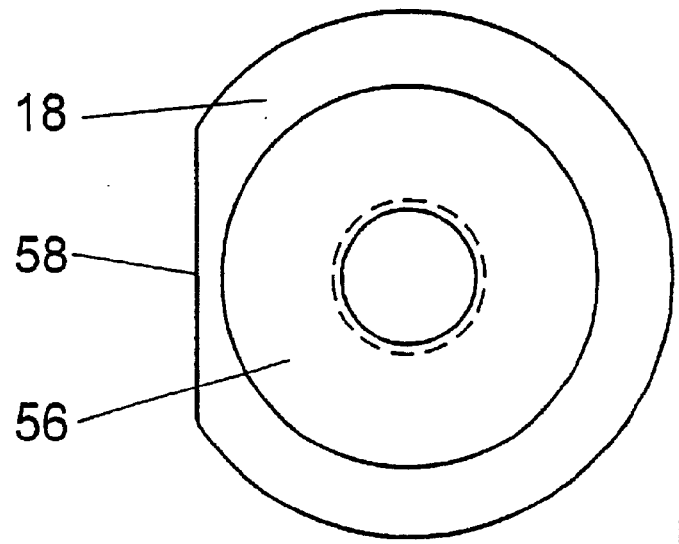

Furthermore, the connecting pieces can have different rotation prevention means. The connecting piece 38 therefore has a recess 34 on one end face and a recess 36 on its collar 18. The wall 28 is pressed inward or caulked into the recesses 34 and 36 (FIG. 5) so that the connecting piece 38 is prevented from rotating in relation to the hollow profile 12. The recesses 34 and 36 can be used individually or jointly and can be affixed to one end face or to both end faces. Corresponding recesses can also be provided on the circumference surfaces of the connecting piece 38. The connecting piece 52 has a cross sectional contour 54 in the form of a polygon, which deviates from a rotational body. A cross sectional contour of this kind can also be disposed on the collar 18. FIG. 10 shows a connecting piece 56, which has a flattening 58 on the circumference, which is used as a rotation prevention means.

Figure 4:
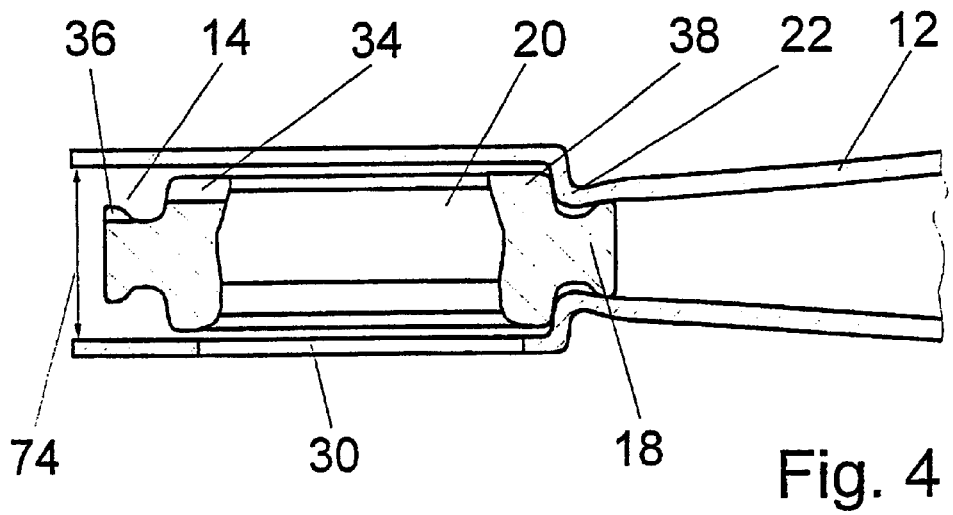
Figure 5:
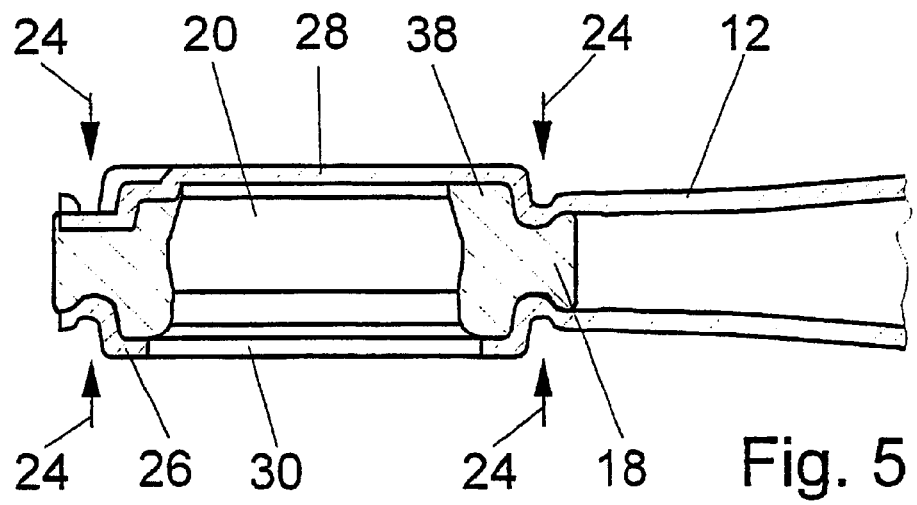

In the vicinity of the connecting pieces 16, 38, 42, 46, 48, 52, 56, the receiving chamber 14 has at least one connecting opening 30, 32. Consequently, levers 10 can be produced which have connecting openings 30 and 32 disposed opposite each other (FIG. 2, FIG. 3) and levers 10 can also be produced which have only one connecting opening 30 and are otherwise closed (FIG. 4, FIG. 5).

The lever according to the invention and the process for manufacturing it consequently cover a multitude of embodiments with simple means.

In the example by hollow profile 12 with two receiving chambers 14 on the ends, FIG. 11 shows a schematic longitudinal section through a tool form 60 for the internal high-pressure process. A pipe section 66 is inserted into a split tool form 60 with a top piece 62 and a bottom piece 64. The pipe ends are closed by means of sealing tools 68. A press, not shown, closes the tool form 60. The pipe section 66 can already be pre-formed in this connection. It is also possible to use otherwise pre-formed pipe sections 66. This is particularly suitable for more complex forms.

Pressure fluid at high pressure is pressed into the pipe section 66 through bores 70 in the sealing tools 68 so that the pipe section 66 rests against the internal contour of the tool form 60 and takes shape. Then the hollow profile 12 is removed from the tool form 60. The connecting openings 30 and 32 as well as the opening 74 are produced, for example, by means of removing a part of the pipe section 66 or by boring or stamping.

The pipe section 66 can be comprised of all kinds of materials. A low-strength galvanized steel pipe has turned out to be particularly favorable; but pipe sections 66 made of an aluminum alloy are very advantageous because of their low weight and their favorable corrosion resistance.

In order to produce the most uniform wall thicknesses possible, during the shaping of the pipe section 66 the pipe ends are suitably slid toward each other with the sealing tools 68 in the direction of the arrows 72. As a result, the material for the shaping of the hollow profile 12 is taken not only from the wall thickness of the remaining pipe section 66, but is also supplied by the shortening of the pipe section 66.

We claim:

1. A process for producing a lever (10) which has at least one prefabricated connecting piece on at least one end, and a hollow profile constituting a receiving chamber on at least one end for receiving the connecting piece so that two opposite walls of the receiving chamber rest tightly against a circumference and end faces of the connecting piece comprising the steps of:

inserting a pipe section (66) into a split tool from (60);

closing the pipe ends by sealing tools (68);

closing the tool form (60);

supplying pressure fluid by means of at least one sealing tool (68);

shaping an internal contour of the tool form (60) with hollow spaces for the hollow profile (12) and at least one receiving chamber (14) by means of pressure increase;

removing the hollow profile (12) from the tool form (60) and opening the at least one receiving chamber (14) formed;

inserting the at least one prefabricated connecting piece (16) into the receiving chamber (14) and pressing the connecting piece with the receiving chamber; and the two connecting pieces (13) are inserted into the two receiving chambers 14 and the opposing balls (26, 28) of the receiving chambers are placed against collars of the connecting pieces by wobble forging.

2. The process according to claim 1, wherein a low-strength galvanized steel pipe is used as the pipe section (66).

3. The process according to claim 1, wherein the pipe section (66) is made of an aluminum alloy.

4. The process according to claim 1, wherein during the shaping of the pipe section (66), the pipe ends are slid toward each other with the sealing tools (66).

5. The process according to claim 1, wherein connecting openings (30, 32) are produced by stamping.

6. The process according to claim 1, wherein connecting openings (30, 32) are produced in a subsequent work cycle.

7. The process according to claim 1, wherein by using the internal high-pressure shaping process, beads (22) are preformed into the opposing walls (26, 28) of the receiving chambers (14) toward a center part of the hollow profile (12).

\* \* \* \* \*